METHOD AND APPARATUS FOR AIR-CLEANING SETTLING TUBE MODULES
Filed Jan. 28, 1971
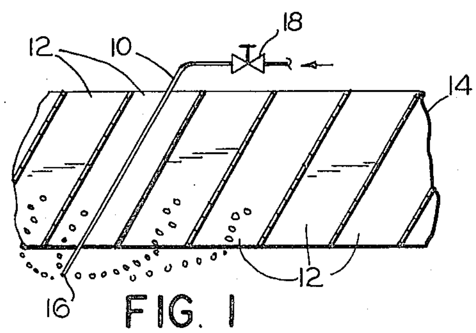
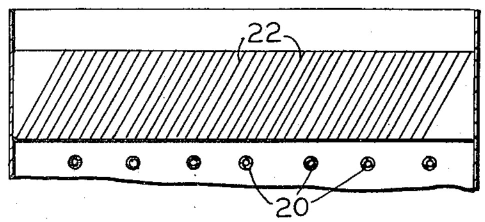
FIG. 2A
26
24
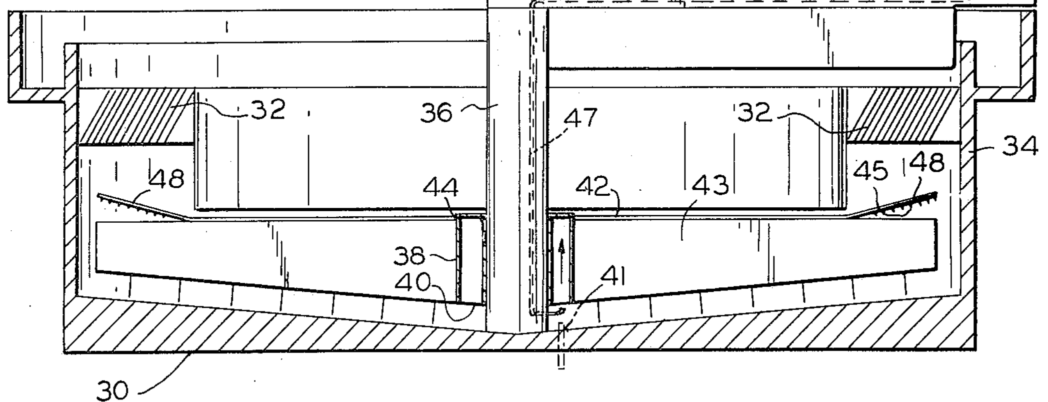
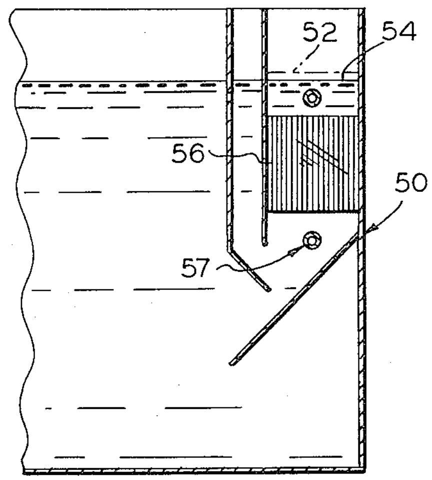
RICHARD G. DUNNAHOE
GARY B. BONDAHL
PAUL W. ROTH
*INVENTORS.*
*BY*
*BUCKHORN, BLORE, KLARQUIST & SPARKMAN*
*ATTORNEYS*

3,669,741

METHOD AND APPARATUS FOR AIR-CLEANING SETTLING TUBE MODULES

Richard G. Dunnahoe and Gary B. Bondahl, Corvallis, and Paul W. Roth, Salem, Oreg., assignors to Neptune Microfloc, Incorporated, Corvallis, Oreg.

Filed Jan. 28, 1971, Ser. No. 110,398
Int. Cl. B08b 9/00
U.S. Cl. 134—22 R 3 Claims

ABSTRACT OF THE DISCLOSURE

Settling tube modules are cleaned of deposited material by injecting air below them while they are immersed in the liquid of the settling basin. The air flows upwardly through the modules causing displacement of liquid from and turbulence in the individual tubes thereof, the settling surfaces being scrubbed clean by the high liquid velocities achieved.

CROSS REFERENCE TO RELATED APPLICATION

Method and Apparatus for Cleaning Settling Tube Modules, patent application of Alfred F. Slechta, Gordon L. Culp and Richard G. Dunnahoe, Ser. No. 59,425, filed July 30, 1970.

BACKGROUND OF THE INVENTION

Settling tubes for use in water and waste treatment processes have been disclosed in U.S. Pat. No. 3,482,694. Such tubes are desirably arranged in modules which are suspended below the level of liquid in the settling basin. Water or other liquid carrying a settleable material is passed in a streamlined flow condition through the tubes to permit the settleable material to deposit therein.

Actual field operating experiences, however, have shown that over a period of time settling tube modules installed in clarification basins treating either domestic or waste waters become covered and eventually fouled with the material being separated in the basin. The problem becomes most severe in waste water applications where the material adhering to the settling tubes becomes septic and as a result, gasifies and floats to the water surface of the basin. In some instances the problem has become quite acute in water treatment plants, especially in those plants treating water having a high organic color content or containing a large number of algae.

Tube settling installations as aforementioned foul or become plugged in a number of different ways. Although the rate of formation is different for each type of plugging phenomenon, different types may actually occur at the same time.

One way in which the tubes become plugged is known as surface bridging. A settling tube which is clean will, with time, tend to have particles of settleable material adhere to the leading or upstream edges thereof. Once the leading edges receive a layer of such material, additional particles tend to attach themselves to the previously deposited material, building inwardly towards the centerline of the tubes.

After a sufficient period of time, the entire tops of the tubes become completely covered with a thin film of suspended material. The resulting mat then starts to operate as a filter. Settleable material not removed in the tubes themselves becomes attached to the lower or bottom part of the mat such that the oldest material remains on top, and the newest material is deposited underneath adjacent the tops of the tubes.

This phenomenon has been observed in water treatment plants. Analysis of a core of material taken from the mat and correlation of the species of algae and protozoan found therein at various depths with those species known to have been present in the raw water during the time of mat formation has verified that the sludge mat is in fact lifted upwardly as previously described. With the passage of time, the mat becomes sufficiently thick so that the deposited material is carried out over the effluent collection troughs.

Settling tubes can also be fouled by internal bridging of the settleable material. This type of phenomenon is most prevalent in waste water applications. In this situation settleable material is deposited on all internal surfaces of the tubes in a manner similar to that which occurs during the fouling or plugging of boiler tubes. In time the material deposited becomes so thick that it completely seals off the tubes.

In addition, it has been observed that a settling tube tends to act like a submerged biological filter. A sufficient amount of surface area is available so that biological growths in the form of slimes can grow on the tubes. Here again with the passage of time the tubes eventually become plugged or the material becomes septic and gasifies.

Another way in which settling tubes become fouled is known as bottom bridging. This phenomenon occurs when the sludge blanket under the tubes is permitted to enter the lower sections or bottoms thereof. In this case, since the solids mass is essentially static, i.e., no free movement of the slurry pool is physically available, a plug is easily formed. In time this plug becomes longer and longer, eventually extending up the length of the settling tube towards the top thereof. With a sufficient amount of time, the material gasifies and is discharged at the top of the basin.

Settling tube modules also become fouled because of inadequate design practices. Such include obstructing the lower ends of individual tubes by the presence of support structures and/or the creation of dead end tubes as by butting a module directly against a concrete wall or an intermediate baffle installed within the basin. Fouling or plugging of settling tubes in any of the above-mentioned ways obviously interferes with the continuous self-cleaning function for which such tubes are designed.

The above-mentioned Slechta et al. application, Ser. No. 59,425, filed July 30, 1970, discloses a method of cleaning settling tube modules by reciprocating the modules in the liquid in which they are suspended to cause relatively rapid motion of the tube surfaces through such liquid.

The primary object of the present invention is to provide another efficient and practical method and apparatus for cleaning deposited material from settling tube modules of the class described.

A further object of the present invention is to provide such a method and apparatus wherein turbulent flow is created in the individual settling tubes such that the settling surfaces thereof are scrubbed or scoured by the high liquid velocities achieved.

A still further object of the present invention is to provide such a method and apparatus wherein the modules can be cleaned while maintaining substantially continuous operation of the settling basins in which they are installed.

SUMMARY OF THE INVENTION

In accordance with the invention, settling tube modules are cleaned of deposited material while suspended in a settling basin by injecting air at a point below the bottoms of the modules to cause the air to flow upwardly therethrough. The flow of air causes a displacement of the liquid in the tubes and results in a considerable amount of turbulence. This action of the movement of the liquid and the associated air bubbles caused by the air flow achieves a relatively high liquid velocity relative to the tube and causes the settling surfaces thereof to be scrubbed or scoured and effectively cleaned of deposited materials.

To accomplish a complete cleaning of the tubes requires between about 1 and 1.5 cubic feet of air per minute per square foot of settling tube module plan area. This amount of air is introduced below the bottom of the module at a pressure of about four p.s.i. Maintaining the flow of air for a period of about five minutes once or twice a day has been found effective in cleaning the tubes.

The frequency and duration of the air cleaning process has been found to vary from installation to installation with field adjustment necessary to determine the optimum cleaning requirements for each specific location and deposit. We have found that air pressure is not critical, being a function of the depth at which it is released.

A variety of apparatus for cleaning modules in rectangular basins have been found effective. For modules suspended in a circular settling basin, an annular accumulator rotatably mounted at the center of such basin and open at its bottom eliminates problems caused by joints or seals. For this type of installation at least one pipe arm is attached to the accumulator, being in communication therewith. The pipe arm extends radially outwardly of the accumulator to a point below the settling tube modules and is provided with a plurality of apertures at its end.

The accumulator and the attached pipe arm are rotatable as part of the usual circular settling basin equipment. Means are provided to introduce air under pressure into the bottom of the accumulator, thereby to discharge air under the modules as the pipe arm rotates therebeneath.

BRIEF DESCRIPTION OF THE DRAWINGS

FIG. 1 is a schematic view of a simple air cleaning apparatus for use with the method of the present invention.

FIG. 2 is a schematic view of another apparatus for use with the present invention.

FIG. 2*a* is a schematic view of still another apparatus for use with the present invention.

FIG. 3 is a cross-sectional view of apparatus in accordance with the present invention shown installed in a circular settling basin.

FIG. 4 is a schematic view of a package sewage treatment plant provided with cleaning apparatus according to the present invention.

DESCRIPTION OF THE PREFERRED EMBODIMENTS

FIG. 1 illustrates a simple air cleaning system according to the present invention. A flexible pipe 10 is inserted down the settling tubes 12 in a module 14, the end 16 of the pipe being positioned at a point below the bottom of the tubes. When air is turned on by means of a valve 18 so that it flows upwardly through the tubes 12, a small area of the module is cleaned. This type of device is most effective in small installations where only a small surface area of tubes has been installed.

FIG. 2 illustrates another embodiment of the invention wherein a number of pipe laterals 20 are fixedly positioned below the bottom of a layer of settling tube modules 22. FIG. 2*a* illustrates a single airpipe 24 which is movable either along the length or width of a settling tube module installation 26. The types of installation shown in FIGS. 2 and 2*a* are most effective in cleaning rectangular clarification units.

The distance between the bottoms of the settling tube modules and the centerlines of the pipes in either installation is not critical. Increasing the depth merely means that a greater area of module cross section can be cleaned with a single pipe, thereby to decrease the total piping requirements of the installation. Decreasing the distance from the bottom of the tubes to the centerline of the air pipe decreases the effective cleaning area of the air lateral and correspondingly increases the piping requirements.

FIG. 3 illustrates a circular settling basin 30 having settling tube modules 32 mounted adjacent the outer wall 34 thereof. A central column 36 in the basin is provided with an annular accumulator 38 of plastic, reinforced plastic, elastomeric material or metal having an open bottom 40 rotatably mounted therearound. Air from a blower 46 is piped to the center of the basin, either through a pipe 47 which runs down through the central column 36 or upwardly through a pipe 41 at the bottom of the basin. The air is discharged beneath the open bottom 40 of the accumulator 38. As the air is discharged into the accumulator, it rises therein and in turn displaces the liquid.

A pipe arm 42 supported by the basin rake 43 is attached to opposite sides of the accumulator 38 at a point 44 below the top thereof. Arms 42 extend generally horizontally and radially outwardly to a point below the modules 32 and are provided with a plurality of apertures 45 positioned at the underside of their ends. Apertures 45 are equal in size and are uniformly spaced radially the length of the modules along the bottom of the pipe arms.

The outermost ends 48 of arms 42 underneath modules 32 are sloped upwardly so that the quantity of air discharged from the radially outermost apertures 45 is greater than that discharged from the radially innermost apertures. This is due to the difference in hydrostatic pressure against which the air is discharged. The design provides for the discharge of a greater quantity of air at the outer ends of the modules where the plan form area is greater.

As air is discharged into the annular accumulator 38, water will be displaced from the top of the accumulator 38 and from the radial arms 42, and the hydrostatic pressure on the air entrapped in these spaces will increase until it is high enough to force air out through the apertures 45 near the ends of the arms 42.

The equipment normally provided in the basin to rotate the basin rake rotates the accumulator 38 with the pipe arms 42 attached. Air introduced into the accumulator 38 in turn is emitted through the apertures 45 at the ends of the arms 42 below the bottoms of the modules 32. Such air then flows upwardly through the modules, displacing liquid from the tubes and causing turbulence therein, to effect cleaning according to the method of the invention. As is evident, use of the open bottom accumulator rotatably mounted at the center of the basin 30 eliminates the need for any mechanical joint or seal between the source of air and the distribution system.

FIG. 4 illustrates the invention incorporated in a package sewage treatment plant 50 as disclosed in Culp et al. Pat. No. 3,472,764. In sewage treatment plants of this type, a rapid buildup of scum 52 consisting of septic or denitrified sludge particles accumulates at the water surface 54 at the rate of approximately one or two inches a day. Air discharged from a drilled pipe 57 disposed below the bottom of the settling tube module 56 has been found not only to keep the tubes thereof clean, but also to break up materials collected on the water surface, permitting them to settle back into the main reservoir of liquids and solids. The use of such air cleaning eliminates the need continually to provide scum removal facilities over the tubes in the aeration basin.

Having described several preferred embodiments of our invention, it should be apparent to those having skill in the art that the same permits various modifications in arrangement and detail. We claim as our invention all such modifications as come within the true spirit and scope of the following claims.

What is claimed is:

1. The method of cleaning deposited material from a settling tube module comprising a plurality of elongated tubes of relatively small diameter inclined upwardly from the horizontal and suspended below the surface in a settling basin, comprising injecting air at a point below the bottom of said module while said basin is in substantially continuous operation such that said tubes in said module are filled with the liquid in said settling tank to cause said air to flow upwardly through said tubes, said air causing displacement of liquid from and turbulence in said tubes to scrub the settling surfaces thereof.

2. The method of claim 1 in which between about 1 and 1.5 cubic feet of air per minute per square foot of settling tube module plan area is injected at a pressure of about four p.s.i.

3. The method of claim 2 in which said air is injected at least once a day for a period of five minutes.

References Cited

UNITED STATES PATENTS

| | | | |
|---|---|---|---|
| 2,338,586 | 1/1944 | Keller | 134—22 |
| 2,662,042 | 12/1953 | Dougherty et al. | 134—22 |
| 2,832,703 | 4/1958 | Bell et al. | 134—22 |
| 3,399,135 | 8/1968 | Conley et al. | 210—42 |
| 3,482,694 | 12/1969 | Rice et al. | 210—73 |

MORRIS O. WOLK, Primary Examiner

J. T. ZATARGA, Assistant Examiner

U.S. Cl. X.R.

134—37